Patented Feb. 15, 1938

2,108,427

UNITED STATES PATENT OFFICE 2,108,427

PREPARATION OF ALPHA, BETA UNSATURATED KETONES

Albert Bernard Boese, Jr., Pittsburgh, Pa., assignor to Carbide and Carbon Chemicals Corporation, a corporation of New York No Drawing. Application May 8, 1936,
Serial No. 78,661

11 Claims. (Cl. 260—131)

The invention relates to the production of alpha, beta unsaturated ketones by condensing diketene with aromatic or aliphatic aldehydes having at least two carbon atoms in the molecule.

According to the invention, the selected aldehyde and diketene preferably are mixed and reacted in approximately equimolecular proportions. The liquid mixture is heated and refluxed at the boiling point for a number of hours. Completion of the reaction usually may be determined by the disappearance of the odor of the diketene and that of the aldehyde. The reaction mixture then is fractionated, generally under either atmospheric or subatmospheric pressure, and the fraction containing the unsaturated ketone is separately condensed and recovered.

The unsaturated ketone evidently is produced by the condensation of the aldehyde with diketene to form a ketol, followed by the elimination of the elements of water from the latter. This in turn is followed by the reaction of the resultant product with water to form a substituted acetoacetic acid, which then loses carbon dioxide, yielding the unsaturated ketone.

These reactions occur concurrently, apparently in accordance with the following general equations, in which R designates a simple or a substituted alkyl, aryl, or aralkyl group:

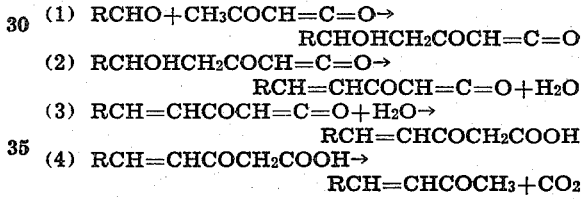

The aldehyde and diketene may be reacted, if desired, in the presence of a volatile solvent nonreactive with the aldehyde and diketene, among which solvents may be mentioned ketones such as acetone and methyl ethyl ketone; ethers such as dioxan, dimethyl ether, diethyl ether, and isopropyl ether; aromatic and aliphatic hydrocarbon, such as benzene, toluene and ligroin; and chlorinated solvents such as ethylene dichloride and trichlorethylene.

Preferably the mixture of reactants is allowed to stand for a number of hours at room temperature before refluxing the mixture, since under such conditions the aldol reaction apparently proceeds more nearly to completion before the dehydration occurs. See Equations (1) and (2).

The following examples will serve to illustrate the invention:

Example I

To 20.6 grams of propionaldehyde were added 29.9 grams of diketene. No initial reaction was observed. After standing at room temperature for 24 hours, the reaction mixture was heated under reflux for 24 hours. The odors of propionaldehyde and diketene disappeared, and the solution became dark. A loss of weight of 15 grams occurred. The product then was fractionally distilled under atmospheric pressure, and the fraction boiling between 128° and 131° C. at atmospheric pressure was separately condensed and recovered. It contained 21 grams of propylidene acetone, thereby providing a yield of 60.2%. Propylidene acetone is a colorless liquid having an odor characteristic of higher unsaturated ketones. It has a composition corresponding to the formula $CH_3CH_2CH=CHCOCH_3$.

Example II

To 80.4 grams of butyraldehyde was added 94 grams of diketene. A slight exothermic reaction occurred and the solution became pale yellow. The solution was cooled and held at room temperature for two days. It then was heated under reflux for two days, at the end of which time the odors of butyraldehyde and diketene had vanished, and a loss of weight of 56 grams had occurred. The reaction product then was fractionated through a two-foot helix-packed column with an electrically-heated jacket and controlled reflux. The fraction boiling between 155° and 160° C. at atmospheric pressure was separately condensed and recovered. It contained 69 grams of butylidene acetone,

corresponding to a yield of around 55%.

Butylidene acetone is a colorless liquid having a characteristic unsaturated ketone odor. It rapidly decolorizes bromine water.

Example III

To 42 grams of diketene were added 50 grams of 2-ethylbutyraldehyde. The resulting solution, after standing at room temperature for 24 hours, was heated under reflux for another 24 hours. A decrease in weight of 20.4 grams occurred, due to loss of $CO_2$; and the odor of diketene disappeared. The mixture then was distilled under atmospheric pressure; and the fraction boiling within the range from 182° to 190° C. under that pressure was separately recovered. It contained 40 grams of 2-ethylbutylidene acetone, $CH_3CH_2CH(C_2H_5)CH=CHCOCH_3$, corresponding to a yield of 57.1%.

Pure 2-ethylbutylidene acetone is a colorless liquid.

*Example IV*

A solution of 27 grams of diketene and 34.1 grams of benzaldehyde in 25 cc. of dioxan was heated under reflux for 45 hours, during which time carbon dioxide was evolved. The solution darkened, and a loss in weight of 14 grams occurred. The reaction mixture then was fractionally distilled under vacuum. There were obtained 18 grams of unreacted benzaldehyde, 7 grams of a liquid boiling at 120° to 125° C. under 10 mm. of mercury absolute pressure, and 21 grams of a non-distillable residue.

The fraction which boiled at 120° to 125° C. under 10 mm. of mercury absolute pressure was redistilled at atmospheric pressure, and yielded 6 grams of benzylidene acetone, in the form of a liquid boiling at 258° to 263° C. under atmospheric pressure, and which, on standing, solidified to a colorless solid which melted at 42° to 44° C. and had the usual properties of this compound.

It is within the purview of the invention to employ, in place of the aldehydes mentioned in these examples, other aliphatic or aromatic aldehydes having more than two carbon atoms in the molecule, such as valeraldehyde, hexaldehyde, heptaldehyde; and other substituted aldehydes wherein each substituting group is inert toward diketene, such as 2-ethylhexaldehyde.

In general, it appears that the yield of alpha, beta unsaturated ketones is improved in instances where the mixture of reactants is permitted to stand in the cold or around room temperature for at least several hours before heating the reactants.

The alpha, beta unsaturated ketones of the present invention, and particularly those of the aliphatic series, are useful as organic solvents, and also as intermediates for the preparation of saturated ketones and alcohols.

The term "alpha, beta-unsaturated ketones" is used in the specification and claims to designate ketones in which the double bond is located between the alpha and beta carbon atoms.

I claim:

1. Process which comprises reacting diketene with an aldehyde having at least two carbon atoms in its molecule, and recovering an alpha, beta unsaturated ketone from the resultant reaction mixture.

2. Process which comprises reacting diketene with an aldehyde having at least two carbon atoms in its molecule, fractionally distilling the resultant reaction mixture, and separately condensing and recovering the fraction containing an alpha, beta unsaturated ketone.

3. Process which comprises reacting diketene and an aldehyde having at least two carbon atoms in its molecule, in the presence of an inert solvent for the diketene, fractionally distilling the resultant reaction mixture, and separately condensing and recovering a fraction containing an alpha, beta unsaturated ketone.

4. Process which comprises refluxing approximately equimolecular proportions of diketene and an aldehyde having at least two carbon atoms in its molecule, fractionally distilling the resultant reaction mixture, and separately condensing and recovering a fraction containing an alpha, beta unsaturated ketone.

5. Process which comprises mixing diketene and an aldehyde having at least two carbon atoms in its molecule, maintaining the mixture in the cold for a substantial period of time, then heating and refluxing the mixture, fractionally distilling the resultant reaction mixture, and separately condensing and recovering a fraction containing an alpha, beta unsaturated ketone.

6. The process of making an alpha, beta unsaturated ketone, which comprises reacting diketene with an aldehyde corresponding to the formula RCHO, wherein R designates either a simple or a substituted alkyl, aryl, or aralkyl group wherein the substituted group is inert to diketene, fractionally distilling the resultant reaction mixture, and separately recovering the said alpha, beta unsaturated ketone present in the latter.

7. The process of making an alpha, beta unsaturated ketone, which comprises maintaining at approximately room temperature for a substantial period of time a mixture containing approximately equimolecular proportions of diketene and an aldehyde corresponding to the formula RCHO, wherein R designates either a simple or a substituted alkyl, aryl, or aralkyl group wherein the substituting group is inert to diketene, thereafter heating and refluxing the said mixture, fractionally distilling the resultant reaction mixture, and separately recovering the said alpha, beta unsaturated ketone present in the latter.

8. The process of making propylidene acetone, which comprises reacting a mixture containing diketene and propionaldehyde, thereafter fractionally distilling the resultant reaction mixture, and separately condensing and recovering the fraction boiling between 128° and 131° C. under atmospheric pressure and containing the propylidene acetone.

9. The process of making 2-ethylbutylidene acetone, which comprises reacting a mixture containing diketene and 2-ethylbutyraldehyde, thereafter fractionally distilling the resultant reaction mixture, and separately condensing and recovering the fraction boiling between 182° and 190° C. under atmospheric pressure and containing the 2-ethylbutylidene acetone.

10. Process of making benzylidene acetone, which comprises heating and reacting diketene with benzaldehyde, fractionally distilling the resultant reaction mixture, and separately recovering the benzylidene acetone therein boiling at 258° to 263° C. under atmospheric pressure.

11. As a chemical compound, 2-ethylbutylidene acetone, the same being a colorless liquid boiling within the range from 182° to 190° C. under atmospheric pressure, and apparently having the structure designated by the formula $CH_3CH_2CH(C_2H_5)CH=CHCOCH_3$.

ALBERT BERNARD BOESE, Jr.